US010525395B2

(12) United States Patent
Mardall et al.

(10) Patent No.: US 10,525,395 B2
(45) Date of Patent: Jan. 7, 2020

(54) VEHICLE AIR SYSTEM WITH HIGH EFFICIENCY FILTER

(71) Applicant: Tesla, Inc., Palo Alto, CA (US)

(72) Inventors: Joseph Mardall, San Francisco, CA (US); Adam Maser, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 199 days.

(21) Appl. No.: 15/609,897

(22) Filed: May 31, 2017

(65) Prior Publication Data

US 2017/0259200 A1 Sep. 14, 2017

Related U.S. Application Data

(63) Continuation of application No. 14/836,852, filed on Aug. 26, 2015, now Pat. No. 9,687,769.

(51) Int. Cl.

| | |
|---|---|
| ***B01D 46/00*** | (2006.01) |
| ***B01D 46/42*** | (2006.01) |
| ***B64D 13/04*** | (2006.01) |
| ***B64D 13/06*** | (2006.01) |
| ***B60H 3/06*** | (2006.01) |
| ***B01D 46/52*** | (2006.01) |

(52) U.S. Cl.
CPC ......... *B01D 46/42* (2013.01); *B01D 46/0023* (2013.01); *B01D 46/0036* (2013.01); *B01D 46/0086* (2013.01); *B01D 46/429* (2013.01); *B01D 46/521* (2013.01); *B60H 3/06* (2013.01)

(58) Field of Classification Search
CPC .... B01D 46/42; B01D 46/0023; B01D 46/00; B01D 46/0036; B01D 46/0086; B60H 3/06; B60H 3/0641; B64D 13/04; B64D 13/06; B64D 2013/0688; B64D 2013/0618; B04D 2013/0618
USPC ....... 55/385.3, 385.2, DIG. 34; 95/273, 287; 96/134, 417, 419; 29/401.1; 454/75, 454/139, 158, 195
See application file for complete search history.

(56) References Cited

U.S. PATENT DOCUMENTS

| | | | |
|---|---|---|---|
| 9,687,769 B2 * | 6/2017 | Mardall | B01D 46/42 |
| 2003/0045225 A1 | 3/2003 | Ruckert et al. | |
| 2008/0125027 A1 * | 5/2008 | Thawani | B60H 1/00678 454/195 |
| 2008/0229720 A1 | 9/2008 | Benscoter et al. | |

(Continued)

*Primary Examiner* — Minh Chau T Pham
(74) *Attorney, Agent, or Firm* — Knobbe, Martens, Olson & Bear, LLP

(57) ABSTRACT

Systems and methods for use in a vehicle can involve determining that a plurality of closures of a vehicle have been closed, running an HVAC system in a fresh air mode after determining that the plurality of closures have been closed, and thereafter recirculating air while adding newly filtered air to maintain a positive air pressure level in a passenger cabin of the vehicle. The determining can occur after one or more people enter the vehicle and being driving, and the recirculating and adding can involve activating a recirculation mode and a fresh air mode simultaneously. Adding newly filtered air maintains a positive air pressure level in a passenger cabin, which level can be set based on an amount of leaks, a user setting, a vehicle type and a pollution level. The determining, running, and recirculating and adding can occur again after determining a vehicle closure has been opened.

20 Claims, 4 Drawing Sheets

114
122
116
104
118
120
106
102
108
112
110
100

(56) References Cited

U.S. PATENT DOCUMENTS

| | | | | |
|---|---|---|---|---|
| 2008/0293349 | A1* | 11/2008 | Weber | B60H 1/00771 454/75 |
| 2012/0214394 | A1* | 8/2012 | Kanemaru | B60H 1/00471 454/139 |
| 2012/0266594 | A1 | 10/2012 | Christmann | |
| 2014/0216257 | A1 | 8/2014 | Knowles | |
| 2015/0099444 | A1 | 4/2015 | Le et al. | |
| 2016/0052364 | A1* | 2/2016 | Sogawa | B60H 1/00028 454/147 |
| 2017/0341484 | A1* | 11/2017 | Santilli | B60H 1/3233 |
| 2017/0356835 | A1* | 12/2017 | Hoke | G01N 15/06 |
| 2017/0361678 | A1* | 12/2017 | Wagner | B60H 1/00849 |
| 2018/0033429 | A1* | 2/2018 | Makke | B60R 16/023 |
| 2018/0345762 | A1* | 12/2018 | Bauer | B01D 53/04 |

* cited by examiner

VEHICLE AIR SYSTEM WITH HIGH EFFICIENCY FILTER

CROSS-REFERENCE TO RELATED APPLICATION

The present U.S. Utility Patent Application claims priority pursuant to 35 U.S.C. § 120 as a continuation of U.S. Utility application Ser. No. 14/836,852 entitled "VEHICLE AIR SYSTEM WITH HIGH EFFICIENCY FILTER," filed Aug. 26, 2015 and now issued as U.S. Pat. No. 9,687,769, which is hereby incorporated herein by reference in its entirety and made part of the present U.S. Utility Patent Application for all purposes.

BACKGROUND

Passenger vehicles with no tailpipe emissions such as electric vehicles are growing in popularity. Nevertheless, the vast majority of vehicles on the road are still powered by engines that combust fossil fuels such as gasoline and diesel. These vehicles contribute to significant air pollution both in their immediate vicinity on the roadway and in the air of all major cities around the world. Air pollution also comes from other human activities such as factories and heavy industries, as well as from natural phenomena such as plants, animals, volcanoes and forest fires.

In many areas, commuting by vehicle is a daily routine for a large part of the population. For example, it is not uncommon to spend a total of an hour or more riding in a car each day, sometimes several hours, to get to and from work. During this time, the driver and passengers are breathing air drawn from the immediate outside of the vehicle. Because of the problems mentioned above, this air can contain significant amounts of pollutants in form of particles and gasses that the occupants inhale into their lungs while riding in the car. Despite the use of traditional air filters in vehicles' heating, ventilation and air conditioning (HVAC) systems, the air delivered into the passenger compartments of today's vehicles contains significant amounts of pollutants. This can negatively affect human health.

SUMMARY

In a first aspect a method comprises: determining that a plurality of closures of a vehicle have been closed at a first time; running an HVAC system in a fresh air mode after determining that the plurality of closures of the vehicle have been closed at the first time; and recirculating air while adding newly filtered air after running the HVAC system in the fresh air mode after determining that the plurality of closures of the vehicle have been closed at the first time.

Implementations can include any or all of the following features. The step of determining that the plurality of closures of the vehicle have been closed occurs after one or more people enter the vehicle and begin driving. The plurality of closures includes doors, windows and a sunroof. The step of recirculating air while adding newly filtered air after running the HVAC system in the fresh air mode after determining that the plurality of closures of the vehicle have been closed at the first time includes activating a recirculation mode and the fresh air mode simultaneously. The recirculation mode and fresh air mode are activated in a predefined balance. Recirculating air while adding newly filtered air after running the HVAC system in the fresh air mode after determining that the plurality of closures of the vehicle have been closed at the first time includes maintaining a positive air pressure level in a passenger cabin of the vehicle. The positive air pressure level is based on one or more of an amount of leaks, a user setting, a vehicle type and a pollution level in ambient air. The pollution level in ambient air is based on a geographical classification of the vehicle. The method may further include the steps of: determining that a closure of the plurality of closures of the vehicle has been opened; determining that the plurality of closures of the vehicle have been closed at a second time after determining that the closure of the plurality of closures of the vehicle has been opened; running the HVAC system in the fresh air mode after determining that the plurality of closures of the vehicle have been closed at the second time; and recirculating air while adding newly filtered air after running the HVAC system in the fresh air mode after determining that the plurality of closures of the vehicle have been closed at the second time.

In a second aspect a system comprises: one or more processors; and a memory; wherein the memory includes machine-readable instructions for causing the one or more processors to determine that a plurality of closures of a vehicle have been closed at a first time; run an HVAC system in a fresh air mode after determining that the plurality of closures of the vehicle have been closed at the first time; and recirculate air while adding newly filtered air after running the HVAC system in the fresh air mode after determining that the plurality of closures of the vehicle have been closed at the first time.

Implementations can include any or all of the following features. The memory further comprises machine-readable instructions for causing the one or more processors to determine that the plurality of closures of the vehicle have been closed after one or more people enter the vehicle and begin driving. The plurality of closures includes doors, windows and a sunroof. The memory further comprises machine-readable instructions for causing the one or more processors to recirculate air while adding newly filtered air after running the HVAC system in the fresh air mode after determining that the plurality of closures of the vehicle have been closed at the first time by activating a recirculation mode and the fresh air mode simultaneously. The recirculation mode and fresh air mode are activated in a predefined balance. The memory further comprises machine-readable instructions for causing the one or more processors to recirculate air while adding newly filtered air after running the HVAC system in the fresh air mode after determining that the plurality of closures of the vehicle have been closed at the first time and maintain a positive air pressure level in a passenger cabin of the vehicle. The positive air pressure level is based on one or more of an amount of leaks, a user setting, a vehicle type and a pollution level in ambient air. The pollution level in ambient air is based on a geographical classification of the vehicle. The memory further comprises machine-readable instructions for causing the one or more processors to: determine that a closure of the plurality of closures of the vehicle has been opened; determine that the plurality of closures of the vehicle have been closed at a second time after determining that the closure of the plurality of closures of the vehicle has been opened; run the HVAC system in the fresh air mode after determining that the plurality of closures of the vehicle have been closed at the second time; and recirculate air while adding newly filtered air after running the HVAC system in the fresh air mode after determining that the plurality of closures of the vehicle have been closed at the second time.

In a third aspect a system comprises: a passenger cabin having a plurality of closures; an HVAC system; a fresh air filter; one or more processors; and a memory; wherein the memory includes machine-readable instructions for causing the one or more processors to determine that the plurality of closures have been closed at a first time; run the HVAC system in a fresh air mode after determining that the plurality of closures have been closed at the first time; and recirculate air while adding newly filtered air that passes through the fresh air filter after running the HVAC system in the fresh air mode after determining that the plurality of closures have been closed at the first time.

Implementations can include any or all of the following features. The memory further comprises machine-readable instructions for causing the one or more processors to recirculate air while adding newly filtered air after running the HVAC system in the fresh air mode after determining that the plurality of closures have been closed at the first time by activating a recirculation mode and the fresh air mode simultaneously.

DETAILED DESCRIPTION

This document describes examples of systems and techniques for filtering the outside air so that it has significantly reduced amounts of particles and gasses before delivering it into the passenger compartment of a vehicle. Also, while the vehicle is in operation, this clean-air state can be preserved by continuously supplying a stream of virtually pollution free air so as to minimize or prevent any influx of unfiltered air from the outside. In some implementations, this provides the occupants air that is essentially hospital-grade or even comparable with that used in ultra-sensitive manufacturing such as silicon wafer fabrication. This approach significantly improves the breathing quality of air in the passenger compartment. The improvement in air quality is noticeable even in geographical areas where the air is relatively clean but it is especially dramatic in heavily polluted regions. There, the air that a person breathes while riding in such a vehicle may well be the cleanest air they encounter at any part of their daily life.

Figure 1:
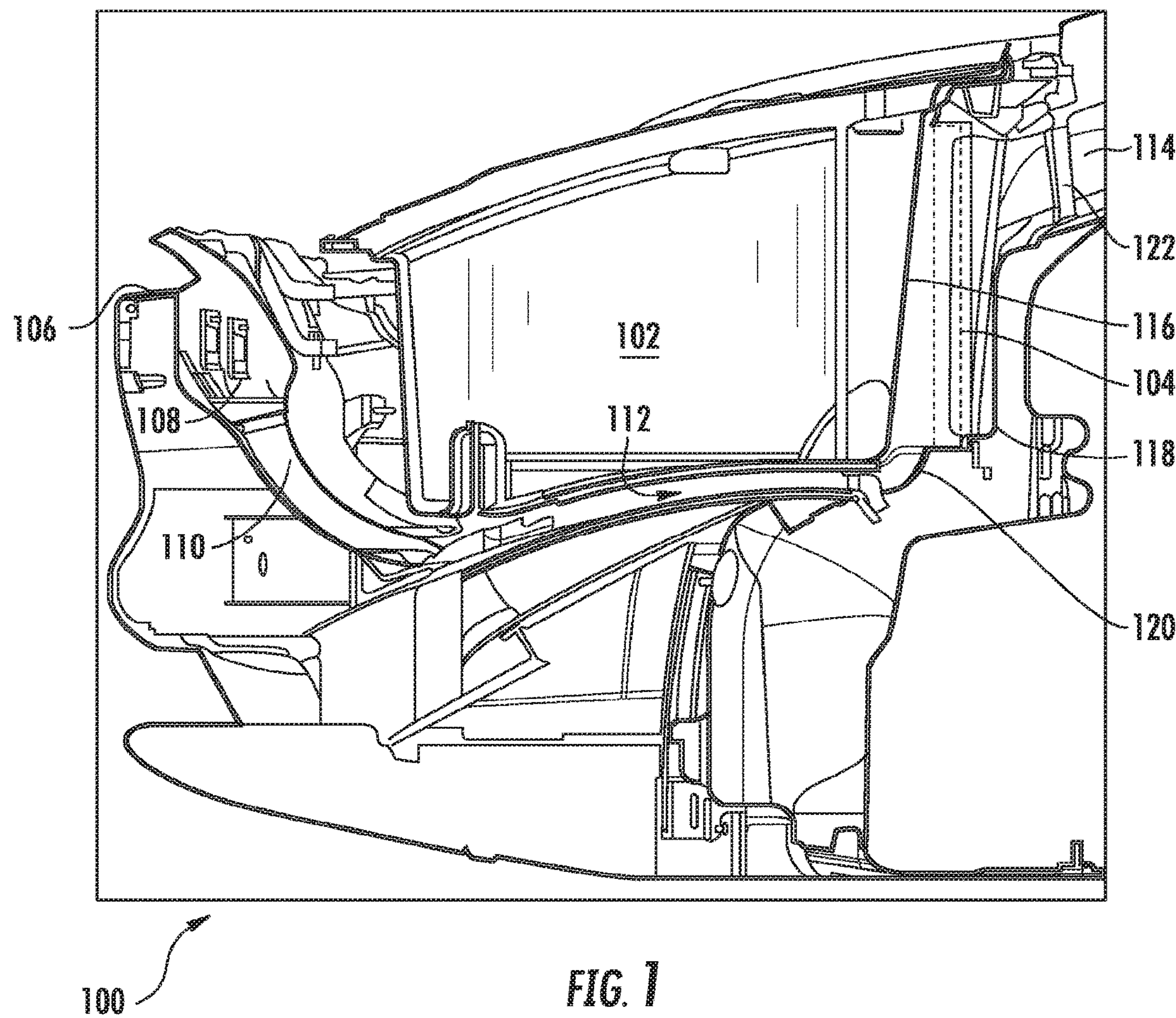
FIG. 1 is a cross section of a vehicle front showing air passageways, a trunk and a fresh air filter.

FIG. 1 is a cross section of a vehicle front 100 showing air passageways, a trunk 102 and a fresh air filter 104 (schematically illustrated). This fresh air filter can be of sufficient quality to meet a HEPA standard for efficiency, such as that it removes more than 99.97% of particles at the 0.3 μm size level. For example, such a filter can include both a fine particulate filter and a gas filter. In some implementations, an air inlet 106 positioned on a forward facing vehicle surface is the single inlet for the filter 104. For example, air can enter through the inlets 106, pass through a grille 108, and be conveyed through a passageway 110. From there, the air is conveyed into an air passageway 112 that leads the air to the filter 104 and thereafter to a duct 114 that leads to the passenger comportment (e.g., via an HVAC system).

Here, the filter 104 is mounted onto a rear exterior surface 116 of the trunk. That is, after the outside air is routed across the bottom outside of the trunk after entering the vehicle, this air can then be cleaned by way of a high efficiency filter on the back of that component. This provides a space efficient solution that also has advantages from a manufacturing/assembly point of view, for example in that the filter can be mounted on the trunk at an earlier stage so that they are installed into the vehicle as one unit.

The fresh air filter is mounted in a position so that the air coming out of the passageway 112 enters the filter at an acute angle. This can provide advantages in filter efficiency compared to, say, installations where the air stream is parallel to the filter immediately before entry. For example, the acute angle is in a range of about 5-15 degrees.

Here, a housing 118 is mounted onto the rear exterior surface 116 to form an enclosure for the filter. That is, the housing can be sealed against the trunk surface so as to completely enclose the filter media except for one or more designated housing inlets and outlets. Here, a bottom housing inlet 120 and a top housing outlet 122 are shown. The housing outlet 122 delivers the filtered air into the duct 114. The housing 118 serves to correctly position the filter 104 relative to the stream of outside air. For example, the housing can be designed so that the housing inlet delivers the air stream at approximately a specific angle relative to the filter media. Moreover, the housing also guides the stream of filtered air as is emerges from the filter media.

That is, this illustration shows an example of an air filtration system for the passenger compartment of a vehicle, wherein such system has a HEPA filter and air passageways formed in the vehicle. The HEPA filter is used for filtering air from an air inlet into filtered air, and the HEPA filter can include a fine particulate filter and a gas filter. The air passageways convey air from the air inlet to the HEPA filter, and then the filtered air from the HEPA filter to the passenger compartment.

Figure 2:
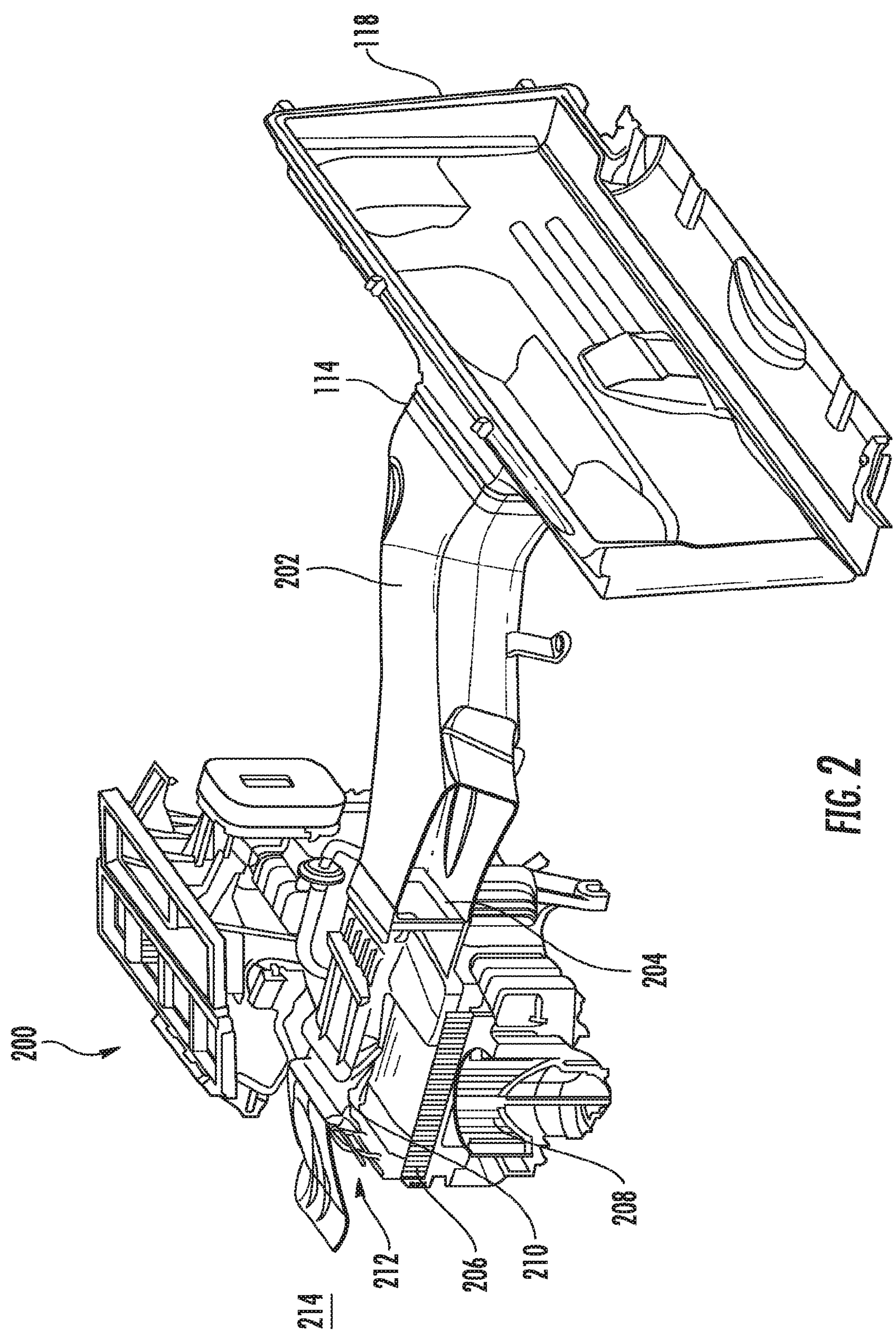
FIG. 2 shows a cross section of an example of an HVAC system connected to the filter housing.

FIG. 2 shows a cross section of an example of an HVAC system 200 connected to the filter housing 118. The housing is here shown without filter media for simplicity. A duct 202 connects the filter housing and the HVAC system with each other. For example, the vehicle has a firewall between the passenger cabin and the front of the vehicle (i.e., what traditionally was the engine compartment in many cars). This firewall has a pass through for the duct 202. Near the filter housing, the duct 202 forms the duct 114 that meets with the outlet 122. Generally, the quality of the duct 202 and its attachment to the filter housing—which are located downstream of the fresh air filter—are more important than the quality of air passageways upstream of the filter.

The other end of the duct 202 leads into the HVAC system at an inlet 204. The HVAC system is designed for conditioning the air, automatically and/or according to user controllable settings. One example is that the HVAC system provides for recirculation of air from the passenger compartment, and for that reason it has an air recirculation filter 206, such as a particle filter. The recirculation filter is here positioned on top of a blower 208 of the HVAC system. The blower essentially controls the flow of air that the HVAC system delivers. In particular, a recirculation door 210 is here positioned above the recirculation filter. The setting of this door determines from where the blower draws air. For example, recirculation air is drawn through a recirculation inlet 212 from a passenger compartment 214 without passing the recirculated air through the fresh air filter. As another example, filtered air is drawn from the fresh air filter through the duct 202. Also, the blower can draw mixes of these two air streams in various proportions. For example, the door 210 is a rotatable three-dimensional structure that at its extreme positions seals off the inlet 204 ("recirculation mode") or the recirculation inlet 212 ("fresh air mode"), respectively. At positions intermediate these two, the door provides a controllable mix of filtered fresh air and recirculated air into the blower. The recirculation inlet 212, the door 210, the filter 206, the blower 208 and the inlet 204 are here shown in cross section for clarity.

That is, the above is an example of a system where the air passageways are formed so that a HEPA filter serves as a fresh air filter, and where the air recirculation filter is positioned downstream of the fresh air filter. Moreover, the system is arranged so that recirculated air from the passenger compartment does not pass through the fresh air filter. In such a system, the air that passes through the air recirculation filter can be filtered air from the fresh air filter, or recirculated air from the passenger compartment, or a combination thereof.

Figure 5:
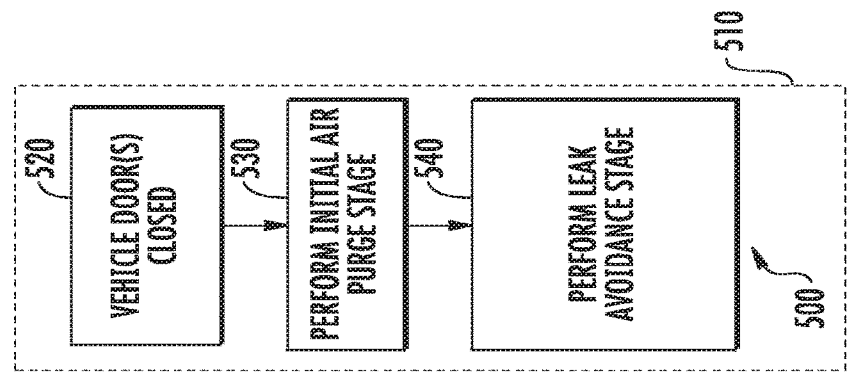
FIGS. 3-5 show examples of methods that can be executed by one or more processors in a vehicle.
Figure 4:
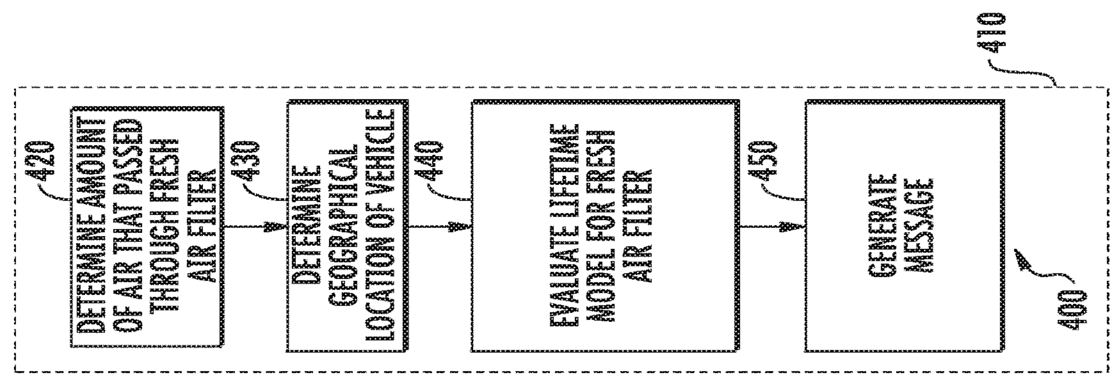
Figure 3:
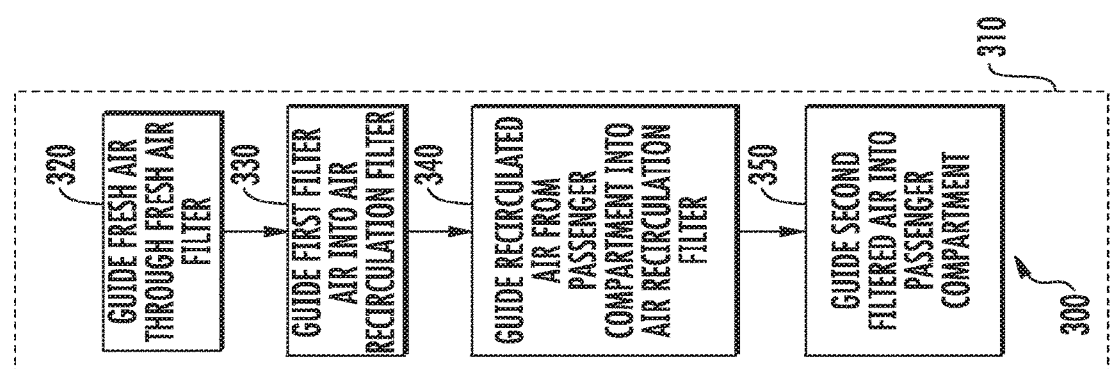

FIGS. 3-5 show examples of methods 300, 400 and 500 that can be executed by one or more processors in a vehicle. Processor-based modules 310, 410 and 510 are here illustrated as the respective environments where the methods can be performed. Any or all of the modules can include a processor with a memory and/or other storage, wherein the processor executes machine-readable instructions to perform these and other operations. For example, any or all of the modules can be implemented in one or more computer chips in the vehicle. Some components of FIGS. 1 and 2 will be referenced for illustrative purposes only.

The method 300 relates to using both a fresh air filter and an air recirculation filter in the vehicle. At 310 fresh air is guided through the fresh air filter. For example, air flowing through the passageway 112 can pass through the fresh air filter 104. This generates first filtered air, for example at the outlet 122.

At 330, the first filtered air is guided into an air recirculation filter. For example, the door 210 can be set to fresh air mode, or to a combination of fresh air mode and recirculation mode, so that the inlet 204 is connected to the recirculation filter 206.

At 340, recirculated air from the passenger compartment is guided into the air recirculation filter. The air recirculation filter generates second filtered air from the first filtered air, or the recirculated air, or a combination thereof. For example, the door 210 can be set to recirculation mode, or to a combination of recirculation mode and fresh air mode, so that the recirculation inlet 212 is connected to the recirculation filter 206.

At 350, the second filtered air is guided into the passenger compartment. As indicated, this air may consist of freshly filtered air alone, or recirculated air from the passenger compartment alone, or a mixture of the two.

The method 400 relates to using a lifetime model for the fresh air filter. Both particulate and gas filters accumulate materials as they are used, and eventually the air resistance, and/or so that the efficiency of gas filtering, decreases. Either way, the filter no longer works as well as it once it and should be cleaned (if possible) or replaced. The fresh air filter provides a significantly higher degree of air filtering and may therefore be costlier to manufacture than traditional air filters. The latter are typically so inexpensive that they are often exchanged at service stations as a matter of course. By contrast, an unnecessary replacement of a highly sophisticated fresh air filter would therefore be a waste of resources. Instead, a filter lifetime model can be used to determine whether it is time to change the filter.

The amount of accumulation in the filter normally depends on the mass of air that has passed through the filter, and how much pollutants were in the air. That is, if the level of pollution in the air and the extent of use of the filter are known, then one can estimate the level of accumulation in the filter at that time, which in turn indicates how much of the filter's lifetime has been used up at that point. That is, a model can be created to estimate the remaining life of a particular type of filter. The lifetime model can be implemented in the vehicle itself, or at a service station where the necessary inputs for the model can be accessed inform of data read from the vehicle.

The filter lifetime model will take into account the level of air pollution, which in turn depends on where the vehicle is driven. For example, there is often more pollutants in the air on a large highway than on a small road; a major city is often more polluted than a town in the countryside; and, as a final example, some countries or continents generally have more air pollution than others. For the filter lifetime model, the quality of air seen by the filter can be determined at the smallest geographical resolution for which the level of air pollution is determinable in a practical way. For example, in a region where air quality data is readily available at a small scale, then the vehicle's global position system (GPS) receiver—or any other way of geographic positioning—can be used to provide input into the model of the pollution to which the filter has been exposed. At a much lower geographical resolution, on the other hand, the vehicle can be labeled as residing in a particular city, or country, or on a specific continent, and the model can then take into account, as one input, a fixed estimated pollution value for that city/country/continent. Intermediates between these separate approaches can be used.

Moreover, the filter lifetime model will take into account what mass of air has passed through the filter. In some implementations, the vehicle's HVAC system is at least partly computer controlled so that a processor can track the respective settings of the system over time. For example, the processor can make a record of the amount of time that the HVAC system has been running, the speed(s) of the blower, and for how long it has been in fresh air mode, or recirculation mode, or a combination thereof, respectively. This information, together with knowledge about the air intake size and the throughput of the filter, indicates the mass of air that has been filtered over time.

Turning now to the operations of the exemplary method 400, at 420 the amount of air that passed through the fresh air filter is determined. In some implementations, the processor of the module 410 reads a record of how long the HVAC system has been run, the blower speed and in what mode(s) the system was operated. For example, this involves determining not only that the fresh air mode was active, but also the relative proportions between the fresh air mode and the recirculation mode (e.g., was the car using 90% fresh air mode, or only 10%?).

At 430, one or more geographical locations of the vehicle are determined. For example, this can involve reading an entry or other label that assigns one of several possible geographical identifications to the vehicle, each such identification being associated with a predefined value for pollution or other air quality. As another example, one can access a record of where the vehicle has been driven. In such approaches that use a higher level of geographical resolution, one can also correlate the HVAC use with the geographical locations to get a more precise indication.

At 440, the lifetime model is evaluated using at least the determined amount and geographical location(s). For example, the processor here takes into account the mass of filtered air and the level of pollution encountered by the filter, and determines how much of the expected filter lifetime remains. For example, this can be expressed as a percentage value where at 100% the filter is new and at 0% the filter can no longer be used.

At 450, a message can be generated. In some implementations, when the estimated remainder of lifetime is below a certain level, the processor can display a message in the vehicle or otherwise notify the driver (e.g., by an electronic message or other signal), or can inform a service technician. For example, the filter lifetime model can be evaluated when the vehicle undergoes a regular service inspection, and the technician is then instructed to exchange the filter only if the evaluation indicates that the filter is close enough to the end of its lifetime.

It was indicated above that some implementations allow the occupants of the vehicle passenger cabin to breathe almost pollution free air. Moreover, it may be useful and desirable to prolong this state of air purification for an extended period. The method 500 therefore provides for maintaining a state of very high air purity inside the vehicle over time.

At 520, it is determined that vehicle closures such as doors, windows and sunroofs have been closed. For example, this situation occurs after one or more people enter the vehicle and begin driving it.

At 530, an initial air purge stage is performed. For example, this involves running the HVAC system in fresh air mode only, so that the passenger compartment is substantially filled with air that was run through the fresh air filter. In some implementations, the air in the passenger compartment is then virtually pollution free.

At 540, a leak avoidance stage is performed. This involves recirculating air from the passenger compartment while continuously adding an amount of the newly filtered air from the fresh air filter. For example, this involves activating both recirculation mode and fresh air mode simultaneously in some predefined balance. This stage is performed so that a positive air pressure is maintained in the passenger compartment.

More particularly, the vehicle is preferably designed so that the passenger cabin is reasonably well sealed against air leakage. This has advantages not only regarding air quality but also noise abatement. However, assuming that the vehicle is not perfectly sealed, the leak avoidance stage can seek to ensure that any leaks that do occur are in the direction out of the vehicle, not into it. That is, by applying a positive air pressure in the passenger compartment, so that the mass of air entering this space other than through the HVAC system is nonexistent or at least negligible, and by consistently feeding some amount of virtually pollution free air by way of the fresh air filter, the state of highly purified air inside the vehicle can be maintained. The level of positive air pressure can be set based on one or more factors, such as: the amount of leaks that are actually occurring (e.g., determined by testing); passenger comfort; a user setting; vehicle type; and pollution level in the ambient air (e.g., based on the vehicle's geographical classification).

Of course, if a vehicle closure (e.g., a door, window or sunroof) is opened, this will allow unfiltered air into the passenger compartment (also referred to herein as a passenger cabin). When the system detects this event, it can (again) start performing the method 500. For example, the system can await the closure of all doors, etc., and thereafter again begin purging the compartment by supplying newly filtered air from the fresh air filter.

Figure 6:
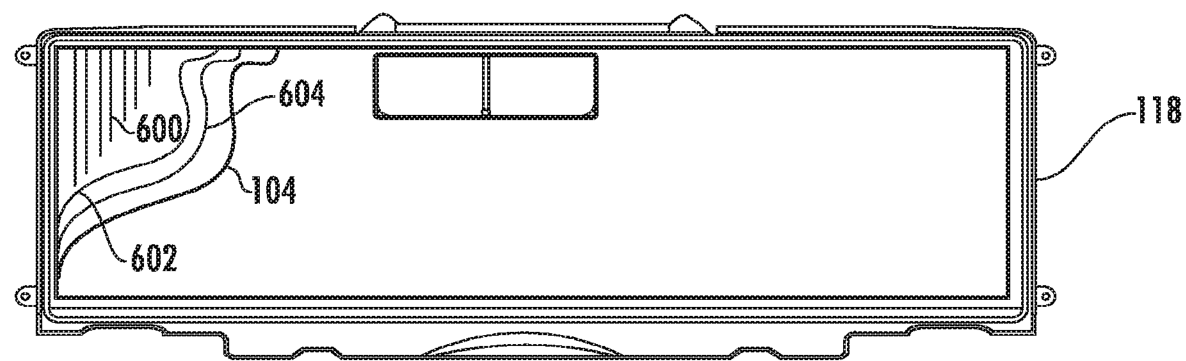
FIG. 6 shows an example of the housing and the fresh air filter.

FIG. 6 shows an example of the housing 118 and the fresh air filter 104. The filter media normally covers essentially all of the housing, but here only a portion of the filter 104 is shown for clarity. In some implementations, the filter is pleated. Pleats 600 (e.g., a zig-zag pleated pattern) can be oriented in any direction, such as vertically.

The fresh air filter can be a HEPA filter. In some implementations, the filter removes more than 99.97% of particles of a 3 μm size. This can be accomplished by using a filter media that includes a fine particulate filter as well as a gas filter. For example, the particle filter is a very fine particle filter 602 capable of obtaining a high degree of purification at the 3 μm level of particles. The gas filter can be a high quality charcoal filter 604 capable of filtering gases by absorption or chemical reaction. In other implementations, a different HEPA level of air filtration can be applied.

The filter 104 can have one or more layers. In the current example, two layers are shown. These layers can be combined into one unit of filter media. For example, the filters 602 and 604 can be co-pleated when the filter media is manufactured.

The dimensions of the housing 118 can be chosen based on the size of the filter media, aerodynamics of the intended air flow, and also the surroundings in the vehicle. In some implementations, the housing has a width of more than 1000 mm and/or has a height of more than 300 mm. As such, the housing accommodates a significantly larger fresh air filter that what is typically used in passenger vehicles and therefore provides more efficient filtering. Moreover, due to the resistance of the media in high efficiency filtering, the air passageways are designed with particular cross section areas to maintain sufficient air pressure along the route from the air inlet to the fresh air filter.

In some implementations, the filter media is permanently bonded into the housing, such as by use of an adhesive. For example, this can avoid the need to provide a separate frame and clips to hold the media in place, and to provide renewable sealing between the housing and the filter. Indeed, for some types of vehicle use (e.g., in regions/countries with little pollution or other particulates in the air) a fresh air filter may never need to be changed throughout the lifetime of the vehicle. In other regions, however, the filter can be replaced when needed, either by reprocessing and cleaning the media, or by installing a new filter media (with the same or a different housing). Also, the housing can serve as the container for the filter media in multiple stages, such as manufacturing, assembly and service/replacement.

In other uses of HEPA filters there is a requirement for traceability regarding where each part was made (e.g., a component of filter media) and how it was tested. In order to claim HEPA grade quality of the filter installation, one must ordinarily prove that this grade of quality was maintained in each step of such a process. This may involve a very robust and traceable method of testing and certifying each filter. However, the introduction of HEPA-grade air filtering for passenger compartments in vehicles is approaching such filtering from a different angle than other industries, namely that of improving the relatively modest level of air filtering being offered inside vehicles today. As such, the significantly higher level of air purification that can be obtained using the systems and techniques described herein is itself a significant improvement compared to what has been available before, whether one adheres to each step of the rigorous procedures of other industries or not.

Indeed, from the automotive production point of view, it may not be necessary or even desirable to test every single filter to ascertain that it is HEPA grade quality. Rather, it may be more advantageous to create a system of manufacturing and assembly that is robust from a design point of view, and to certify the production process as robust, which is a standard approach in the automotive industry. That is, auto manufacturers often do not individually test each component for every single vehicle, but instead perform testing on the production process as such, to check that it is robust and capable of making a large number of quality parts. After such verification, the process is allowed to run its course and one regularly performs spot checking of sample products.

As a practical situation, rather than having the entire manufacturing and assembly process for high efficiency fresh air filters be inspected by a certifying body, the automotive manufacturer performs real world testing. For example, a vehicle is built according to specification, including the fresh air filter, and is then driven in some of the most polluted areas of the world for a significant time, while air quality measurements are being taken in the passenger compartment.

A number of implementations have been described as examples. Nevertheless, other implementations are covered by the following claims.

What is claimed is:

1. A method for use in a vehicle having a passenger compartment and a plurality of closures that separate the passenger compartment from an external environment, the method comprising:

determining that the plurality of closures of the vehicle have been closed;

in response to determining that the plurality of closures of the vehicle have been closed, performing an initial air purge stage including running a heating, ventilation and air conditioning (HVAC) system of the vehicle in a fresh air mode such that the passenger compartment is substantially filled with air, from the external environment, that is filtered by a fresh air filter of the vehicle; and following completion of the initial air purge stage, performing a leak avoidance stage wherein the HVAC system of the vehicle recirculates air from the passenger compartment while simultaneously adding air filtered by the fresh air filter of the vehicle such that a positive air pressure level is maintained in the passenger compartment.

2. The method of claim 1, where the step of determining that the plurality of closures of the vehicle have been closed occurs after one or more people enter the vehicle and the vehicle is in operation.

3. The method of claim 1, wherein the plurality of closures of the vehicle include doors, windows and a sunroof.

4. The method of claim 1, wherein recirculating air from the passenger compartment occurs in a recirculation mode in which the air from the passenger compartment passes through a recirculation filter of the vehicle and does not pass through the fresh air filter.

5. The method of claim 4, wherein the recirculation mode and fresh air mode are activated in a predefined balance.

6. The method of claim 1, wherein the fresh air filter comprises a fine particulate filter and a gas filter.

7. The method of claim 1, wherein the positive air pressure level is based on one or more of an amount of leaks of the vehicle, a user setting, a vehicle type or a pollution level in ambient air.

8. The method of claim 7, wherein the pollution level in ambient air is determined based on a geographical classification of the vehicle.

9. The method of claim 1, further comprising:

determining that a closure of the plurality of closures of the vehicle has been opened;

determining that the plurality of closures of the vehicle have been closed after determining that the closure of the plurality of closures of the vehicle has been opened;

in response to determining that the plurality of closures of the vehicle have been closed, performing a second initial purge stage; and following completion of the second initial purge stage, performing a second leak avoidance stage.

10. A system for use in a vehicle having a passenger compartment and a plurality of closures that separate the passenger compartment from an external environment, the system comprising:

one or more processors; and a memory coupled to the one or more processors, wherein the memory includes machine-readable instructions that, when executed by the one or more processors, causes the one or more processors to:

determine that the plurality of closures of the vehicle have been closed;

in response to determining that the plurality of closures of the vehicle have been closed, perform an initial air purge stage including running a heating, ventilation and air conditioning (HVAC) system of the vehicle in a fresh air mode such that the passenger compartment is substantially filled with air, from the external environment, that is filtered by a fresh air filter of the vehicle; and following completion of the initial air purge stage, perform a leak avoidance stage wherein the HVAC system of the vehicle recirculates air from the passenger compartment while simultaneously adding air filtered by the fresh air filter of the vehicle such that a positive air pressure level is maintained in the passenger compartment.

11. The system of claim 10, wherein the memory further comprises machine-readable instructions for causing the one or more processors to determine that the plurality of closures of the vehicle have been closed after one or more people enter the vehicle and the vehicle is in operation.

12. The system of claim 10, wherein the plurality of closures of the vehicle include doors, windows and a sunroof.

13. The system of claim 10, wherein recirculating air from the passenger compartment occurs in a recirculation mode in which the air from the passenger compartment passes through a recirculation filter of the vehicle and does not pass through the fresh air filter.

14. The system of claim 13, wherein the recirculation mode and fresh air mode are activated in a predefined balance.

15. The system of claim 10, wherein the fresh air filter comprises a fine particulate filter and a gas filter.

16. The system of claim 10, wherein the positive air pressure level is based on one or more of an amount of leaks of the vehicle, a user setting, a vehicle type or a pollution level in ambient air.

17. The system of claim 16, wherein the pollution level in ambient air is determined based on a geographical classification of the vehicle.

18. The system of claim 10, wherein the memory further comprises machine-readable instructions for causing the one or more processors to:

determine that a closure of the plurality of closures of the vehicle has been opened;

determine that the plurality of closures of the vehicle have been closed after determining that the closure of the plurality of closures of the vehicle has been opened;

in response to determining that the plurality of closures of the vehicle have been closed, perform a second initial purge stage; and following completion of the second initial purge stage, perform a second leak avoidance stage.

19. A vehicle comprising:

a passenger compartment having a plurality of closures;

a heating, ventilation and air conditioning (HVAC) system;

a fresh air filter;

one or more processors; and a memory coupled to the one or more processors, wherein the memory includes machine-readable instructions that, when executed by the one or more processors, causes the one or more processors to:

determine that the plurality of closures have been closed in response to determining that the plurality of closures of the vehicle have been closed, perform an initial air purge stage including running the HVAC system of the vehicle in a fresh air mode such that the passenger compartment is substantially filled with air, from an external environment, that is filtered by a fresh air filter of the vehicle; and following completion of the initial air purge stage, perform a leak avoidance stage wherein the HVAC system of the vehicle recirculates air from the passenger compartment while simultaneously adding air filtered by the fresh air filter of the vehicle such that a positive air pressure level is maintained in the passenger compartment.

20. The system of claim 19, wherein recirculating air from the passenger compartment occurs in a recirculation mode in which the air from the passenger compartment passes through a recirculation filter of the vehicle and does not pass through the fresh air filter.

* * * * *